United States Patent [19]

Pace

[11] 3,839,648

[45] Oct. 1, 1974

[54] PROGRAMMABLE FUNCTION GENERATION

[75] Inventor: John W. Pace, Aloha, Oreg.

[73] Assignee: Tektronix, Inc., Beaverton, Oreg.

[22] Filed: Mar. 14, 1973

[21] Appl. No.: 340,975

Related U.S. Application Data

[62] Division of Ser. No. 229,901, Feb. 28, 1972, Pat. No. 3,740,539.

[52] U.S. Cl. .................. 307/229, 307/254, 307/310, 330/30 D

[51] Int. Cl. .............................................. H03k 17/00

[58] Field of Search .................... 330/30 D, 69, 270; 307/229, 230; 328/184

[56] References Cited

UNITED STATES PATENTS

| | | | |
|---|---|---|---|
| 3,275,926 | 9/1966 | Sheheen | 307/229 X |
| 3,419,784 | 12/1968 | Winn | 307/229 |
| 3,419,810 | 12/1968 | Xlyander | 330/30 D |
| 3,564,428 | 2/1971 | Demark | 328/184 X |
| 3,689,752 | 9/1972 | Gilbert | 307/229 X |

*Primary Examiner*—Rudolph V. Rolinec
*Assistant Examiner*—B. P. Davis
*Attorney, Agent, or Firm*—Klarquist, Sparkman, Campbell, Leigh, Hall, & Whinston

[57] ABSTRACT

A programmable function generator, which is suitable for construction in integrated circuit form, includes a current ladder which produces an output voltage or current which is a programmable function of an input voltage or current at n evenly spaced values of the input voltage or current corresponding to n spaced output points along the current ladder. Accurately controlled current sources or current drivers control the flow of currents to each of the *n* points and the flow of current from terminals of said current ladder including compensated current drivers, one of which differentially controls current flow from end terminals of the current ladder in response to a variable input control voltage or current which, for example, may be a linear ramp of voltage or current.

5 Claims, 4 Drawing Figures

PROGRAMMABLE FUNCTION GENERATION

This is a division of application Ser. No. 229,901 filed Feb. 28, 1972 now U.S. Pat. No. 3,740,539.

BACKGROUND OF THE INVENTION

This invention relates to the field of function generators for constructing or simulating electrical waveforms, for example a sine wave as well as asymmetrical or other variant waveforms, in response to an input signal. Many function generators can also be programmed to produce asymmetrical or other variant waveform outputs. Prior art examples of this programmable variety includes diode type function generators, servo motor systems using cams and drums, and digital memory systems.

The diode type generators are often difficult to program and do not have independent adjustments at each programming point. Furthermore, while they are capable of responding to input signals relatively fast, they are rather sensitive to temperature variation. Servo motor systems are usually large and expensive consuming a considerable amount of power while responding slowly to the input waveform. Digital systems also have numerous drawbacks. They are usually expensive because the input waveform must be converted from analog to digital form, operated on and then reconverted to analog form. Thus, they require analog to digital and digital to analog converters as well as a digital memory unit. Furthermore, this mode of operation results in an output which varies in discrete steps.

SUMMARY OF THE INVENTION

Programmable function generators, according to the present invention, have the advantages of being small and inexpensive to make, and of consuming little power and responding rapidly to relatively fast changing input signals. It is contemplated that almost the entire system can be put into one or more integrated circuits.

The programmable function generator includes a current ladder for sequentially actuating a plurality of output transistors. When actuated, each transistor connects a particular resistor pair to a current source. A selected portion of this current flow is utilized to produce the output waveform. The programming is accomplished by varying the ratios of each resistor pair, each of which may be programmed independent of the others.

The current ladder is supplied with equal currents delivered to node points along the ladder and is operated by a differential current driver which causes smoothly changing complementary currents to flow from end terminals of the ladder in response to an external signal. As a function of this current flow each of the various node points of the current ladder will be sequentially at a voltage peak sufficient to actuate its associated output transistor. A voltage limiting circuit enables the length of the current ladder to be increased to thereby increase the number of programmable points which can be employed wihtout producing excessive voltage drops along the ladder, and compensated current sources or current drivers stabilize the operation of the function generator against temperature variations of the properties of the components of the circuit.

Since each point along the ladder is independently programmable, the function generator of the present invention lends itself to computer programming and other means of precisely and rapidly varying the output waveform. Furthermore, if precision potentiometers are employed as the resistor pairs, accurate simulation of nonlinear functions can be obtained.

It is therefore an object of the present invention to provide an improved function generator circuit having an independently programmable output.

It is a further object of the present invention to provide an improved transistorized function generator circuit adapted for integrated circuit fabrication.

It is another object of the present invention to provide a function generator whose output will not change due to variation in component characteristics due to temperature variation.

It is a further object of the present invention to provide means for making the output waveform between the programmable points a linear interpolation of the output at said points.

It is a still further object of the present invention to linearize the complementary shifting of current flowing to the current driver from the end terminals of the current ladder.

CROSS REFERENCE TO RELATED APPLICATIONS

The present application is related to copending application Ser. No. 845,393, filed July 28, 1969, now U.S. Pat. No. 3,651,510; to copending application Ser. No. 151,927, filed June 10, 1971, a divisional application of said U.S. Pat. No. 3,651,510; to copending application Ser. No. 27,765, filed Apr. 13, 1970, now U.S. Pat. No. 3,689,752; and to copending application Ser. No. 258,111, filed May 30, 1972, divisional application of said U.S. Pat. No. 3,689,752. All of such patents and applications are assigned to the assignee of the present invention.

DETAILED DESCRIPTION OF THE PREFERRED EMBODIMENT

Figures 1, 4:
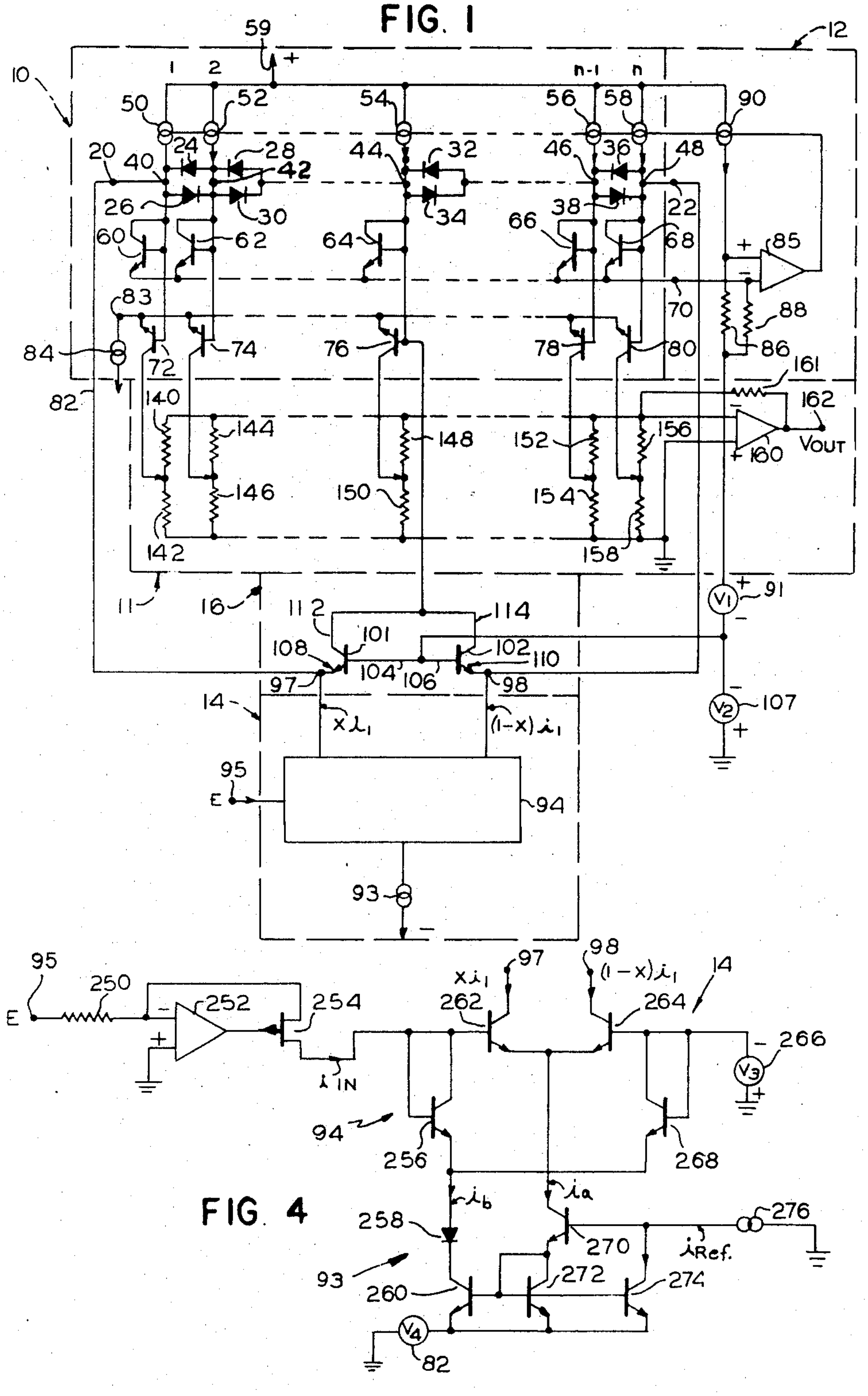
FIG. 1 is a schematic diagram of a function generator according to the present invention.
FIG. 4 is a schematic diagram of a differential current driver according to the present invention.

The circuit shown in FIG. 1 includes a current ladder 10, an output resistor network 11, a current regulator 12, a differential current driver 14 and a voltage limiter 16.

The current ladder 10 has a pair of terminals 20, 22 disposed at each of its ends. The current ladder includes a plurality of reversely connected parallel diode pairs including the pairs 24,26; 28,30; 32,34 and 36,38 disposed in series between the input terminals. The reversely connected diodes separate and define node points including node points 40, 42, 44, 46 and 48; the nodes 40 and 48 being at the terminals 20 and 22, respectively. Current sources 50, 52, 54, 56 and 58 each provide a unit current I from a positive voltage supply 59 to nodes 40, 42, 44, 46 and 48, respectively. Also connected these nodes are the bases and collectors of diode connected transistors 60, 62, 64, 66 and 68, respectively, the emitters of which are connected to a common terminal 70. These diode connected transistors function as, and may be replaced by, conventional diodes. The nodes are also connected to the bases of transistors 72, 74, 76, 78 and 80, respectively. The emitters of these transistors are all connected to a negative voltage supply 82 through a terminal 83 and a current source 84. When conducting, the emitter of each transistor supplies a current to source 84 from the output resistor network 11. While five stages or nodes are shown, it will be understood that a considerably larger number of such stages with associated node points and connected diodes and transistors will ordinarily be employed.

Terminal 70 is connected to the negative input of a differential voltage amplifier 85 forming part of the current regulator circuit 12 which also includes matched resistors 86, 88 and another unit current source 90. The resistor 86 is connected between the output of the current source 90 and the positive terminal of a voltage source 91. The resistor 88 is connected between the terminal 70 and the same positive voltage source terminal. The voltage drop developed across resistor 88 from terminal 70 to the voltage source 91 is thus applied to the negative input of the differential voltage amplifier 85, while the voltage drop across resistor 86 from current source 90 to the voltage source 91 is applied to the positive input of the amplifier 85. The output of the differential voltage amplifier 85 is fed back to the unit current sources 50, 52, 54, 56, 58 and 90 to regulate the current flow through such sources to maintain the current through terminal 70 at a precise value substantially equal to each of the unit currents I.

If the current through terminal 70 should decrease relative to the current from source 90, the voltage drop across resistor 88 will decrease correspondingly to cause the voltage at the negative input to the differential voltage amplifier 85 to decrease. A decrease in the voltage at the negative input results in an increased positive output which causes an increase in current flow from the unit current sources. In a like manner, if the current flow through terminal 70 increases relative to the current flow from unit current source 90, the voltage output from the amplifier 85 to the current sources will decrease until the current flow through terminal 70 returns to its proper unit value.

For purposes of explaining the operation of the current ladder 10, it will first be assumed that all current flowing from the current ladder except that flowing through the terminal 70 flows through the terminals 20 and 22, the sum of the currents flowing through the terminals 20 and 22 being designated $i_1$. The current ladder 10 is operated by employing the differential current driver 14 to cause smoothly changing, complementary currents to flow from the terminals 20 and 22 through such differential current driver. The current driver 14 contains a current source 93 and a current dividing circuit 94, the detailed structure and operation of which will be explained in connection with FIG. 4. However, the function of the current driver 14 may be explained as follows.

Figure 2:
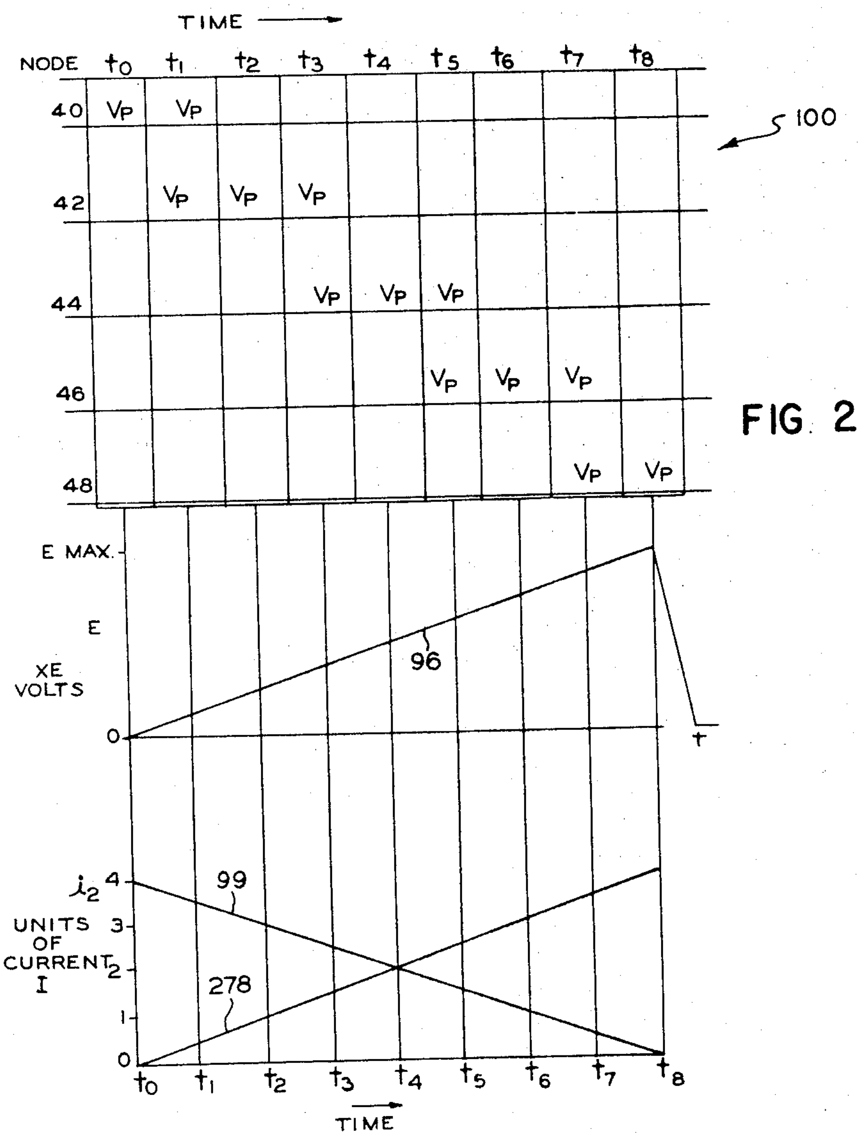
FIG. 2 is a time sequence table illustrating the various relationships among the input voltage, the currents from the current ladder and the occurrence of voltage peaks at the node points of the ladder.

An external voltage E is supplied to the current dividing circuit 94 of the current driver 14 through an input terminal 95 and this voltage varies according to the relation $E = XE_{max}$, where $E_{max}$ is a predetermined maximum value of E and X varies from 0 to 1. For example, if $X$ varies linearly from 0 to 1 a linear voltage ramp, such as the voltage ramp 96 of FIG. 2 varying from 0 to $E_{max}$, will be applied through the terminal 95. The current driver 94 will sink the current $i_1$ and as the input voltage $E$ varies with $X$, the current through the terminal 97 of the current dividing circuit 94 of the current driver 14, and the terminal 20 of the current ladder 10 will equal $Xi_1$ and the current through the terminal 98 of the current driver and the terminal 22 of the current ladder will equal $(1 - X)\, i_1$. As $X$ increases from 0 to 1, the current flowing from the ladder 10 through terminal 22 decreases linearly from $i_1$ to 0 and the current from the ladder through terminal 20 increases linearly from 0 to $i_1$ as indicated in FIG. 2. The sum of the currents from the ladder 10 out of the terminals 20, 22 is thus maintained constant but the fraction through each terminal varies complementarily in a smoothly changing manner.

For discussion purposes the number of stages or node points in the ladder is assumed to be equal to 5, i.e., $n = 5$. Further, at a time $t = t_0$ let $X = 0$ so that all the current from the ladder to the differential current driver 14 is through terminal 22 as shown by the curve 99 of FIG. 2. The current through the terminal 70 which causes the regulator 12 to control the unit sources 50, 52, 54, 56 and 58 to each deliver a current to the current ladder equal to the unit current I is actually such unit current I minus the total base current or currents of selected ones of the transistors 72, 74, 76, 78 and 80 as described below. This total base current remains very nearly constant so that the current flow from the current ladder 10 through the terminal 70 can be employed to control the unit current sources by making the resistance value of the resistor 88 of the regulator 12 greater than that of the resistor 86. The total current flowing out of the current ladder 10 through terminals 20 and 22 will be $(n - 1)$ I or 41. That is, a current of one I is supplied to terminal 22 from each of the current sources 52, 54, 56 and 58 via diodes 30, 34 and 38. The unit current source 50 will then supply the unit current of one I required by the regulator 12 and as base current for transistors 72, 74, 76, 78 or 80.

Under the circumstances just described there will be a voltage peak $V_p$ at the terminal 20, i.e., node 40 of the current ladder, at time $t_0$ as indicated in the table 100 of FIG. 2. It is clear that the voltage at node 42 at this time will be higher than at any of the nodes 44, 46 or 48 because of the voltage drops across the diodes 30, 34 and 38 which conduct current to the terminal 22. The voltage at node 42 will however be lower than that necessary to render diode connected transistor 62 to become conducting since the voltage at the node 42 will not go any higher than that necessary to cause the unit current source 52 to supply one unit current I to the current ladder 10 which, with unit current sources 54, 56 and 58, will supply the current of 4I required to flow through the terminal 22 at time $t_0$.

The voltage at the node 40 will however be sufficiently higher than voltage at node 42 to cause the diode connected transistor 60 to become conducting, the voltage at the node 40 being determined by the voltage necessary to supply the current required by the voltage regulator 12 through the terminal 70 and the base current of transistor 70, this voltage being determined by the voltage from the voltage source 91 and the voltage drop caused by current flow through the diode connected transistor 60 and the resistor 88. Thus, at time $t_0$ node 40 will be at a voltage maximum or peak as indicated in the table of FIG. 2, while each of the nodes to the right will be progressively more negative. Only diode connected transistor 60 will conduct current to terminal 70 and the base of transistor 72, while the current from sources 52, 54, 56 and 58 will all flow out through terminal 22. Conduction of transistor 72 connected to node 40 will enable current $i_2$ to flow from ground potential through the output network 11 and through the collector emitter path of this transistor and then through the current source 84 to the negative voltage supply 82.

At a later point in the cycle indicated by $t_1$ of FIG. 2, an increase in input voltage at the terminal 95 of the current driver 14 will cause the factor X of the relation $Xi_1$ to increase to a point where a current I/2 is flowing out of terminal 20. The current out of terminal 22 will then be $4I-(I/2)$ or 7/2 I. In this case, the unit current I from current source 50 will be evenly split; I/2 flowing through terminal 20 to the current driver 14 and I/2 flowing through diode connected transistor 60. To satisfy the regulator 12 and the base currents of transistors 72 and 74, both of which will be conducting, an additional I/2 must be supplied by one of the remaining current sources 52, 54, 56 or 58. The voltages along the current ladder to the right of node 40 will increase until the voltage at node 42 will cause diode connected transistor 62 to conduct and supply current I/2 from the current source 52. The voltage at both nodes 40 and 42 will be equal and will provide the voltage peak $V_p$ as indicated by the table 100 of FIG. 2. Thus diode connected transistor 62 will conduct the additional current I/2 to terminal 70 required to satisfy the regulator 12 and the base current of transistors 72 and 74.

Under the conditions just described, in which the nodes 40 and 42 are at the same voltage, both transistors 72 and 74 will conduct equally. The current $i_2$ from the output network 11 to source 84 will split evenly between the transistors one-half going through transistor 72 and one-half going through transistor 74. For intermediate values of the increasing input voltage E on the voltage ramp 96 of FIG. 2 between times $t_0$ and $t_1$, the conduction of diode connected transistor 60 and transistor 72 will decrease and the conduction of diode connected transistor 62 and transistor 74 will increase, as such input voltage increases. There is thus a smooth current transition between transistors 72 and 74 which varies linearly with the input voltage E applied to the terminal 95 of the current driver 14.

As the voltage of the ramp 92 continues to increase a still greater portion of the current from the source 50 will flow through terminal 20 and the current flow from node 40 through diode connected transistor 60 will decrease correspondingly. The current flow through diode connected transistor 62 will therefore increase, so that the total current flow to terminal 70 remains a constant as required by regulator 12. At a time $t_2$, the current flow through terminal 20 is I, the entire output of current source 50. Accordingly, no current will flow through diode connected transistor 60 and transistor 72 will have ceased to conduct current and all of the current to terminal 70 will be from current source 52 through diode connected transistor 62. Transistor 74 alone will have a sufficiently positive base to conduct the current $i_2$ from the output network to the current source 84. Node 42 only will be at the voltage peak at time $t_2$, $V_p$, as is shown in FIG. 2. In a similar manner, the voltage peak will continue to move from left to right in response to an increase of the voltage E applied to the terminal 95 of the current driver 14. Thus, the transistors 72, 74, 76, 78 and 80 will be sequentially rendered conducting when the voltage peak arrives at the respective nodes as indicated in FIG. 2. A cycle of operation is completed when the last transistor 80 has been rendered conducting and the voltage E is then returned to zero.

While the number of stages or nodes in the above discussion was assumed to be 5, it will be readily apparent that a very much greater number of stages will ordinarily be employed. The limiting factor is the reverse breakdown voltages of the transistors connected to the nodes at terminals 20 and 22 at the ends of the current ladder 10. As the number of nodes are increased, the voltage at the terminal 20 or 22 of the current ladder remote from the voltage peak at the beginning or end portions of the cycle will exceed the reverse breakdown voltage of the base-emitter junctions of the transistors adjacent such terminal. The voltage limiter 16 shown in FIG. 1 may be employed to effectively shorten the current ladder by dividing it into sections during a cycle of operation.

The voltage limiter 16 comprises a pair of NPN transistors 101 and 102. The base leads 104 and 106 of such transistors are connected to a negative voltage reference determined by the voltage source 107 having its negative terminal connected to the negative terminal of the voltage source 91 and its positive terminal connected to ground. The emitter leads 108 and 110 are connected to the terminals 20 and 22, respectively, of the current ladder 10. The collector leads 112 and 114 are tied together and connected to the node 44 of the current ladder 10 at or adjacent the midpoint of the ladder.

The voltage limiter 16 diverts current from a central node of the current ladder 10 before the voltage at one of the terminals 20 or 22 becomes sufficiently negative to cause transistor breakdown. Thus transistor 101 will have its emitter driven negative with respect to its base to cause such transistor to conduct current from node 44 of the current ladder 10 which would otherwise flow through the diodes, such as diodes 34 and 38, connected between node 44 and the terminal 20. Transistor 102 will similarly become conducting near the beginning of such cycle to conduct current from the node 44. In either case, the node 44 of the current ladder connected to the collector of the transistors 101 and 102 becomes an effective end of the current ladder 10. A voltage peak or near peak will occur at the same node of the current ladder 10 irrespective of whether the voltage limiter 16 diverts current from the ladder. Thus the voltage limiter will not affect the ladder operation other than to enable its length to be made greater. For example, at the beginning of a cycle, the voltage peak will be at node 40. All nodes to the right in FIG. 1 will be at a lower potential due to the voltage drop across diode 26. Thus it makes no difference whether the current flowing through nodes to the right of node 40 is withdrawn from the ladder at terminal 22 or node 44.

The output resistor network 11 for the current ladder 10 is a programmable network including a plurality of current dividers made up of resistor pairs 140, 142; 144, 146; 148, 150; 152, 154 and 156, 158. The amplifier 160 and associated feedback resistor 161 is also a part of such network.

If one only of the transistors 72, 74, 76, 78 and 80, for example the transistor 72 at time $t_o$, is conducting, the current $i_2$ flows through the current divider resistor pair connected thereto, for example the resistor pair 140 and 142. Thus the current source 84 will cause the emitter of the transistor 72 to go sufficiently negative to cause the collector current of such transistor to be the current $i_2$. The voltage $V_{out}$ at the output 162 of the amplifier 160 will then be directly proportional to the current $i_2$ and the resistance of the resistor 142. Thus it is easily shown that $V_{out} = i_2 [R_{161} R_{142}/(R_{140} + R_{142})]$ where the $R$ indicates the resistance of the resistor having the various subscripts. The resistance of $R_{161}$ will have a constant value and while not essential, the sum $R_{140} = R_{142}$ can also be a constant. In this case $V_{out} = Ki_2 R_{142}$, where $K$ is a constant. Since $i_2$ is also held constant $V_{out}$ will be directly proportional to the resistance of $R_{142}$.

If two of the transistors 72, 74, 76, 78 and 80, such as the transistors 72 and 74 are conducting as discussed above, so that the constant current $i_2$ divides between the two resistor pairs 140, 142 and 144, 146, the output voltage $V_{out}$ of the amplifier 161 will be intermediate in value between such output voltage when all of the current $i_2$ flows through the transistor 72 and resistor pair 140, 142 and such output voltage when all of the current $i_2$ flows through transistor 74 and resistor pair 144, 146. For example when the peak voltage along the voltage ladder 10 causes equal current $i_2/2$ to flow through the transistors 72 and 74 and current source 84, the voltage output at the terminal 162 of the amplifier 160 will be $V_{out} = K [(R_{142} + R_{146})/2]$. This is the average of the two output voltages obtained when all of the current $i_2$ flows through transistor 72 and then all of the current flows through transistor 74. There is thus a substantially linear transition from the output voltage when the voltage peak $V_p$ along the current ladder 10 is at one node and the output voltage when this peak is at the next adjacent node and such peak is moved along the ladder from one of such nodes to the other by varying the voltage input to the terminal 95 of the current driver 14.

In the same manner, the output voltage at the output terminal 162 of the amplifier 16 will vary according to preset current divider resistor ratios as the corresponding transistors 72, 74, 76, 78 and 80 are sequentially caused to conduct. The output voltage is thus a programmable function of the input voltage at $n$ evenly spaced values. If the value of the current $i_2$ is properly regulated so as to be held constant, the values of output voltage between the $n$ points will be a substantially linear interpolation of the output voltages at the nearest points. It is desirable to provide a maximum number of programmable points, $n$, in order that a desired waveform may be more closely approximated by the function generator. The voltage limiter 16 described previously, enables a larger number of programmable points to be employed without danger of damage to the transistors in the current ladder.

Figure 3:
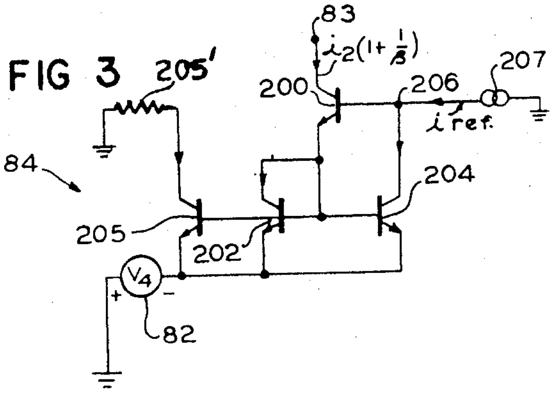
FIG. 3 is a schematic diagram of a compensated current source according to the present invention.

The effects of temperature upon the transistors 72, 74, 76, 78 and 80 of the current ladder 10 must be compensated for if a selected output waveform is to be reproducible at any time. This is accomplished by accurately temperature compensating the current source 84 in a manner which holds the total collector current of such transistors very close to a constant value under changing temperature conditions. Such total collector current is the current $i_2$ from the current divider resistor network 11. The total current through the current source 84, however, also includes the base current of one or two such transistors which are conducting as discussed above with respect to the current regulator 12. The current flowing through the current source 84 is therefor equal to $i_2 (1 + [1/\beta])$ where $\beta$ is the current amplification of any one of the transistors 72, 74, 76, 78 or 80. The circuit of FIG. 3 is a compensated current source which may be employed as the current source 84 of FIG. 1 to temperature stabilize the output current of such transistors even though the current gains $\beta$ of such transistors all change with temperature. The circuit is similar to that disclosed in U.S. Pat. No. 3,588,672 except that it employs an additional transistor 205.

The compensated current source of FIG. 3 includes the NPN transistors 200, 202, 204 and 205. Each transistor has an identical current gain $\beta$ which is also the same as the current gain of each of the transistors 72, 74, 76, 78 and 80. The bases of transistors 202, 204 and 205 are coupled together and to the emitter of transistor 200 so that the base currents of transistors 202, 204 and 205 are part of the emitter current of transistor 200. The emitters of transistors 202, 204 and 205 are likewise coupled together and connected to a negative voltage supply. Transistor 202 also has its collector coupled to the emitter of transistor 200 and thus functions as a diode. The collector of transistor 200 is connected through terminal 83 to the emitters of the current ladder transistors 72, 74, 76, 78 and 80 for receiving the current $i_2 (1 + ]1/\beta])$ from such transistors. The collector of transistor 205 is coupled to ground through a resistor 205'. A constant current $i_{ref}$ is supplied to terminal 206 from a controlled current source 207. Most of this current flows through the collector emitter path of transistor 204 while a small portion supplies the base current of transistor 200.

Assume the base current of the transistor 200 can be very nearly equal to $i_{ref}/\beta$ so that the collector current of the transistor 204 is equal to $i_{ref} (1 - [1/\beta])$. The bases of the transistors 202 and 204 are connected together and the same is true of the emitters of these transistors. Also transistor 200 is an emitter follower so that the collector voltage of transistor 202 is very nearly the same as the collector voltage of transistor 204. Under these conditions the collector current of transistor 202 is very close to being the same as the collector current of transistor 204 and is also $i_{ref} (1 - [1/\beta])$.

The transistor 205 also has its base and emitter connected to the base and emitter respectively of the transistor 204, and the collector voltage of the transistor 205 is very close to the collector potential of transistor 204. The base currents of all three transistors 202, 204 and 205 are therefor all equal to each other and to $i_{ref} (1 - [1/\beta]) (1/\beta)$ which is very nearly equal to $i_{ref}/\beta$. This is true since $i_{ref}(1 - [1/\beta]) (1/\beta)$ equals $i_{ref}([1/\beta] - [1/\beta^2])$ and $1/\beta^2$ is a very small quantity and can be neglected.

The base currents of all three transistors 202, 204 and 205 are part of the emitter current of transistor 200. The transistor 205 is employed in the circuit of FIG. 3 for the purpose of adding a third base current to the base currents of the two transistors 202 and 204 so that the emitter current of the transistor 200 is equal to $i_{ref}(1-[1/\beta])+(3i_{ref}/\beta)=i_{ref}(1=[2/\beta])$. The collector current of transistor 200 equals its emitter current less $i_{ref}/\beta$ so that the collector current of transistor 200 is $i_{ref}$ $(1+[1/\beta])$, $i_2$ must equal $i_{ref}$ and the base current of transistor 200 is very nearly equal to $i_{ref}/\beta$ as originally assumed.

The amount of current $i_2$ flowing from the current divider resistance network 11 through the transistors is therefore completely controlled by the constant current $i_{ref}$ so long as the transistors 72, 74, 76, 78 and 80 all have the same current gain as the transistors of the circuit of FIG. 3.

The current source 84 is itself temperature compensated so that the relation between the reference current $i_{ref}$ and the collector current of transistor 200 remains very close to being constant except for the $1/\beta$ term. This is the temperature compensation of U.S. Pat. No. 3,588,672 and can be briefly explained as follows.

If the collector current of the transistor 200 tends to increase because of a temperature increase, the collector current of transistor 204 increases by a substantially similar amount also because of such temperature increase. Since the reference current $i_{ref}$ is constant, the base current of transistor 200 is decreased to decrease the collector current of transistor 200 to hold such collector current substantially constant. Any change in the base currents of transistors 72, 74, 76, 78 and 80 is compensated by a similar change in the base currents of transistors 202, 204 and 205 so that the current $i_2$ flowing from the current divider resistor network 11 through the transistors 72, 74, 76, 78 and 80 remains substantially equal to $i_{ref}$. The accuracy of the control of the constancy of the current $i_2$ is such that it is feasible to employ 10 turn precision potentiometers to accurately set the values of the resistor pairs of the current divider resistor network 11.

FIG. 4 shows the preferred embodiment of the differential current driver 14. The voltage input circuit for the current driver includes a resistor 250 connected in series between the voltage input terminal 95 and the negative input of a differential amplifier 252, the positive input of such amplifier being connected to ground. The output of the amplifier 250 is connected to the gate of an P channel field effect transistor 254 which has its source connected back to the negative input of the amplifier and its drain connected through the collector-emitter path of a diode connected NPN transistor 256, a diode 258 and the collector-emitter path of an NPN transistor 260 to a negative voltage source which may be the voltage source 82 of FIG. 3.

The connection of the source of the field effect transistor 254 to the negative input of the amplifier provides a source follower negative feedback to such negative input to hold such negative input at ground potential as the voltage $E_{in}$ at the input terminal 95 is increased in a positive direction. The current through the resistor 250 is $E/R_{250}$ where $R_{250}$ is the resistance of the resistor 250 and this is also the drain current of the transistor 254, which is the input current $i_{in}$ of the voltage divider circuit 14. This input current $i_{in}$ is a linear function of the input voltage $E$.

As stated previously the voltage E is varied from zero to $E_{max}$ as the factor $X$ varies from 0 to 1 and the current $i_{in}$ likewise varies from 0 to $i_{max}$ as $X$ varies from 0 to 1. The current $i_{max}$ is the input current which will cause the current through the terminal 20 of the current ladder 10 and the terminal 97 of the current driver 14 to change from zero to $i_1$ according to the relation $Xi_1$, and the current through the terminal 22 of the current ladder 10 and the terminal 98 of the current driver 14 to change from $i_1$ to zero according to the relation $(1-X)i_1$.

Most of any current $i_{in}$ from the field effect transistor 254, when the input voltage E is greater than zero, flows through the diode connected NPN transistor 256 and the remainder supplies base current of a current divider NPN transistor 262 which has its collector connected to the terminal 97 and its emitter connected to the emitter of another current divider NPN transistor 264 having its collector connected to the terminal 98. The base of the transistor 264 is connected to a negative voltage source 266 which is also connected to base and collector of a diode connected NPN transistor 268 which has its emitter connected to the emitter of the diode connected NPN transistor 256. As explained below, when the current $i_{in}$ from the field effect transistor 254 is less than $i_{max}$, current flows from the voltage source 266 through the diode connected transistor 268 and then through the diode 258 and transistor 260 to the voltage source 82. The voltage source 266 also supplies base current to the transistor 264.

The emitters of the transistors 262 and 264 are connected to the collector of an NPN transistor 270 which has its emitter connected to the collector and base of a diode connected NPN transistor 272. The base of the transistor 272 is also connected to the base of the transistor 260 and to the base of another NPN transistor 274 which has its collector connected to a controlled current source 276 which furnishes a reference current $i_{ref}$, most of which flows through the collector-emitter path of transistor 274. The base of the transistor 270 is also connected to the current source 276 so that the remainder of $i_{ref}$ is the base current of transistor 270.

The emitters of transistors 272 and 274 are connected to the emitter of transistor 260 and to the voltage source 82. All of the NPN transistors of FIG. 4 have the same current gain $\beta$. The transistors 260, 270, 272 and 274 are connected in the circuit of FIG. 4 in exactly the same manner as the transistors 205, 200, 202 and 204 of the temperature compensated current source 84 of FIG. 3 and operate in the same manner.

If the transistors 260, 272 and 274 are identical, the collector currents of each of these transistors is equal to $i_{ref}(1-[1/\beta])$ so that the emitter current of transistor 270 is equal to $i_{ref}(1+[2/\beta])$ and the collector current $i_a$, which is the total emitter current of the current divider transistors, is equal to $i_{ref}(1+[1/\beta])$. The total collector current $i_1$ of the transistors 262 and 264 is then equal to $i_{ref}$ since it is the current $i_a$ less the total base currents of such transistors. This current $i_1$ is equal to $(n-1)\,I$ where $I$ is the unit current of the regulated current sources 50, 52, 54, 56 and 58 of the current ladder 10 and $n$ is the number of nodes of such ladder.

Since the collector current $i_b$ of the transistor 260 is equal to $i_{ref}$ $(1-[1/\beta])$, the maximum current $i_{max}$ from the field effect transistor is also $i_{ref}$ as it also contains the total base currents of the transistors 262 and 264. The maximum voltage $E_{max}$ which is applied to the input terminal 95 of the current driver 14 is then $i_{ref}$ times $R_{250}$.

When the input voltage E applied to the input terminal 95 of the current driver 14 at time $t_o$ is zero, the input current $i_{in}$ is also zero. Under these conditions all of the collector current for the transistor 260 plus the base current of the current divider resistor transistor 264 is supplied from the voltage source 266 so that the current from such source at such time is also $i_{ref}$. The collector current of this transistor is $i_1 = i_{ref}$ since X equals zero at time $t_0$. The circuit of FIG. 4 containing the transistors 260, 270, 272 and 274 has the same temperature compensating properties as the circuit of FIG. 3.

The total input current from the field effect transistor 254 and the voltage source 266 is held at the constant value $i_{ref}$ and as the current $i_{in}$ from the field effect transistor 254 is increased, the current from the voltage source 266 complementarily decreases.

The voltage drops through the diode connected transistors 256 and 268 vary exponentially with the currents therethrough to cause the base currents of the transistors to vary with the currents through the diode connected transistors 256 and 268, respectively, so that the collector current of the transistor 262 varies directly with $X$, i.e., with the input current $i_{in}$ from the field effect transistor 254, and thus directly with the input voltage $E$ applied to the input terminal 95. The result is an accurate transition of the current $i_1 = (n - 1) I$ from the terminal 20 of the current ladder 10 to the terminal 22 of such ladder and this transition is a linear function of the input voltage $E$ from the input terminal 95 of the current driver 14 and of the input current $i_{in}$ from the field effect transistor 254. If E varies linearly with time as indicated by the voltage ramp 96 of FIG. 2, the current through the terminal 20 varies linearly from zero to $(n - 1) I$, as indicated by the current ramp 99 and the current through the terminal varies linearly from $(n - 1) I$ to zero as indicated by the current ramp 278 so that the total current from the terminals 20 and 22 is always $(n - 1)I = i_2$.

In the above discussion of the circuit of FIG. 4, it was assumed that all of the transistors of such circuit are identical. However a current $i_1$ which is a factor $y$ times the reference current can be controlled by a given reference current $i_{ref}$. This can be done by scaling up the transistors 272 as well as transistors 262, 264 and 270 so that their base-emitter and base-collector junctions have $y$ times the areas of the similar junctions of the other transistors in such circuit. By so doing $i_1 = y i_{ref}$ where $y$ can have a value of 4, for example, or even a larger value. It can be shown that this does not effect the accuracy of the control of $i_1$ by the reference current $i_{ref}$, and that the maximum value $i_{max}$ of the input current from the field effect transistor 254 remains equal to $i_{ref}$.

All of the circuits described above cooperate to provide an extremely accurate function generator which can be programmed to produce any desired function. The current regulator 12 insures that the total current supplied to the current ladder by the unit current sources 50, 52, 54, 56 and 58 is exactly the complementary currents required by the differential current driver 14 plus the base currents of the output transistors 72, 74, 76, 78 and 80 and the current required by the regulator 12 itself. The regulator 12 makes the function generator stable, accurate and very independent of any common mode current from the differential current driver 14.

It will be apparent that current ladder 10 may have other types of series impedances, such as resistors, instead of the reversely connected diodes shown in FIG. 1 and that such ladder with its associated regulator 12 and output transistors can be employed with any other suitable current source for providing a constant output current from such transistors and with any other suitable current driver for regulating and complementarily varying the currents flowing from the terminals 20 and 22. It should be noted that these currents can be varied other than linearly according to any desired input function either by the current driver circuit shown in FIG. 4, or other suitable current driver. Also the outputs from the collectosrs of such transistors of such current ladder can be employed in output circuits other than the current divider resistor network 11 shown in FIG. 1.

The circuit of the controlled and compensated current source of FIG. 3 can also be employed wherever an accurate current source with a base current component is required and similarly the current driver circuit of FIG. 4 wherever it is desired to complementarily vary two currents. It is to be noted that the current flowing through the terminal 83 of the circuit of FIG. 3 can be made to have any desired value with respect to the current $i_{ref}$ from the current source 207 by scaling up the junction areas of the transistors 202 and 200 in the same manner described with respect to the transistors 272, 270, 262 and 264 of FIG. 4.

I claim:

1. Differential current driver means for causing linearly varying complementary current flow from a pair of terminals external thereto in response to an externally applied varying signal comprising:

means for converting said externally applied varying signal to a varying control current;

a pair of current conducting means comprising emitter-coupled transistor means for receiving said complementary current flow from said pair of terminals and for transferring said complementary current flow therebetween in response to said control current, the base current of one of said transistor means being controlled by said control current;

current compensating means for receiving said current flow from said current conducting means to stabilize said current flow against change due to temperature variation of said current conducting means, wherein said current compensating means establishes the current therethrough at a standard value plus substantially the value of base current for said conducting means according to the value of beta for the transistor means;

and circuit means to linearize the transfer of said current flow between said pair of current conducting means.

2. The circuit of claim 1 wherein said means for converting said externally applied signal comprises operational amplifier means.

3. The circuit of claim 1 wherein said compensating means includes a first transistor having a predetermined current flow therethrough;

and wherein said circuit means comprises diode means for connecting the major portion of said control current to said first transistor and for producing a voltage drop in response to said control current to control said current conducting means to thereby linearize the transfer of current between said current conducting means;

the predetermined current of said first transistor being established at a standard value less substantially the value of base current of said conducting means.

4. The circuit of claim 3 wherein said compensating means further includes:

a current source for providing a current at said standard value;

second, third and fourth transistors;

the said first, second and third transistors having their bases coupled in common and having their emitters coupled in common to a voltage source, the collector of the third transistor being coupled to said current source;

and means for coupling the base of the fourth transistor to the collector of the third transistor, and for coupling the emitter of the fourth transistor to the collector of the second transistor as well as to the common base coupling of the first, second and third transistors;

wherein the collector of the fourth transistor is coupled to receive said current flow from said current conducting means.

5. A current compensating circuit comprising:

a current source for providing a current at a standard value;

first, second, third and fourth transistors wherein the first, second and third transistors have their bases coupled in common and have their emitters coupled in common to a voltage source, the collector of the third transistor being coupled to said current source;

and means for coupling the base of the fourth transistor to the collector of the third transistor, and for coupling the emitter of the fourth transistor to the collector of the second transistor as well as to the common base coupling of the first, second and third transistors;

wherein the collector of the fourth transistor provides a current at said standard value plus substantially the value of transistor base current as governed by the value of beta of said transistors, and wherein the first transistor provides a current at the standard value minus substantially the value of said base current.

* * * * *

UNITED STATES PATENT OFFICE
CERTIFICATE OF CORRECTION

PATENT NO. : 3,839,648

DATED : October 1, 1974

INVENTOR(S) : John W. Pace

It is certified that error appears in the above-identified patent and that said Letters Patent are hereby corrected as shown below:

Column 2, line 68, after "connected" insert --to--.

Column 4, line 39, "41" should be --4I--.

Column 5, line 19, "7/2I" should be -- $\frac{7}{2}$I --.

Column 8, line 34, "(1+]1/β])" should be --$(1+\frac{1}{\beta})$--.

Column 9, line 1, "(1=[2/β])" should be --$(1+\frac{2}{\beta})$--.

Column 12, line 12, "collectosrs" should be --collectors--.

Signed and sealed this 3rd day of June 1975.

(SEAL)
Attest:

RUTH C. MASON
Attesting Officer

C. MARSHALL DANN
Commissioner of Patents
and Trademarks